(12) United States Patent
Davis

(10) Patent No.: US 6,592,126 B2
(45) Date of Patent: Jul. 15, 2003

(54) MECHANICAL SEAL LEAK DETECTOR

(75) Inventor: Duane J. Davis, Battle Creek, MI (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 09/910,389

(22) Filed: Jul. 20, 2001

(65) Prior Publication Data

US 2003/0015840 A1 Jan. 23, 2003

(51) Int. Cl.$^7$ ................................................ F16J 15/00
(52) U.S. Cl. ........................ 277/320; 277/408; 137/312; 137/558; 73/866.5
(58) Field of Search ................................ 277/320, 408; 137/312–314, 558, 15.11; 138/104; 73/861.41, 866.5

(56) References Cited

U.S. PATENT DOCUMENTS

| | | | |
|---|---|---|---|
| 2,463,703 A | | 3/1949 | Legler |
| 3,589,737 A | * | 6/1971 | Sedy .......................... 277/320 |
| 3,749,411 A | | 7/1973 | Lennon |
| 3,834,235 A | * | 9/1974 | Bouton et al. .............. 116/227 |
| 3,955,822 A | | 5/1976 | Irby |
| 4,094,512 A | * | 6/1978 | Back .......................... 277/320 |
| 4,397,648 A | * | 8/1983 | Knute ................. 128/DIG. 13 |
| 4,424,973 A | * | 1/1984 | Heilala ....................... 277/318 |
| 4,458,521 A | | 7/1984 | Pillette |
| 4,557,139 A | | 12/1985 | Cantwell et al. |
| 4,573,344 A | * | 3/1986 | Ezekoye ................. 73/40.5 R |
| 4,601,194 A | | 7/1986 | Miller et al. |
| 4,713,552 A | * | 12/1987 | Denis et al. ................ 250/577 |
| 4,854,823 A | | 8/1989 | Hatting et al. |
| 4,901,751 A | | 2/1990 | Story et al. |
| 4,936,828 A | * | 6/1990 | Chiang ....................... 604/253 |
| 4,972,867 A | | 11/1990 | Ruesch |
| 5,065,139 A | | 11/1991 | Shefsky |
| 5,090,871 A | | 2/1992 | Story et al. |
| 5,148,699 A | * | 9/1992 | Morse ........................ 166/84.1 |
| 5,170,659 A | | 12/1992 | Kemp |
| 5,245,860 A | * | 9/1993 | Chang et al. .......... 166/250.08 |
| 5,265,465 A | * | 11/1993 | Thomas ...................... 73/40.7 |
| 5,427,136 A | | 6/1995 | Weishew |
| 5,476,004 A | * | 12/1995 | Kingsford ................... 137/312 |
| 5,546,009 A | | 8/1996 | Raphael |
| 5,588,963 A | * | 12/1996 | Roelofs ....................... 604/65 |
| 5,694,974 A | | 12/1997 | Niemiro et al. |
| 6,094,970 A | | 8/2000 | Sprenger et al. |
| 6,325,377 B1 | | 12/2001 | Williamson et al. |

FOREIGN PATENT DOCUMENTS

| JP | 3-168394 | * | 7/1991 |
|---|---|---|---|
| JP | 6-50439 | * | 2/1994 |

OTHER PUBLICATIONS

Relevant chapters of FillCheck Installation & Operating Manual, May 17, 2001, Innovative Sensor Solutions, Ltd. (30 pages).
Relevant chapters of FuelCheck Installation & Operating Manual, May 17, 2001, Innovative Sensor Solutions, Ltd. (17 pages).

* cited by examiner

Primary Examiner—Anthony Knight
Assistant Examiner—Alison K. Pickard
(74) Attorney, Agent, or Firm—Flynn, Thiel, Boutell & Tanis, P.C.

(57) ABSTRACT

A mechanical seal assembly includes a leak detector mounted thereon for detecting low rates of liquid leakage across the seal rings of the mechanical seal. The leakage detector collects the liquid leakage and includes a fiber optic sensor for detecting the leakage once the flow rate of the leakage becomes excessive.

23 Claims, 6 Drawing Sheets

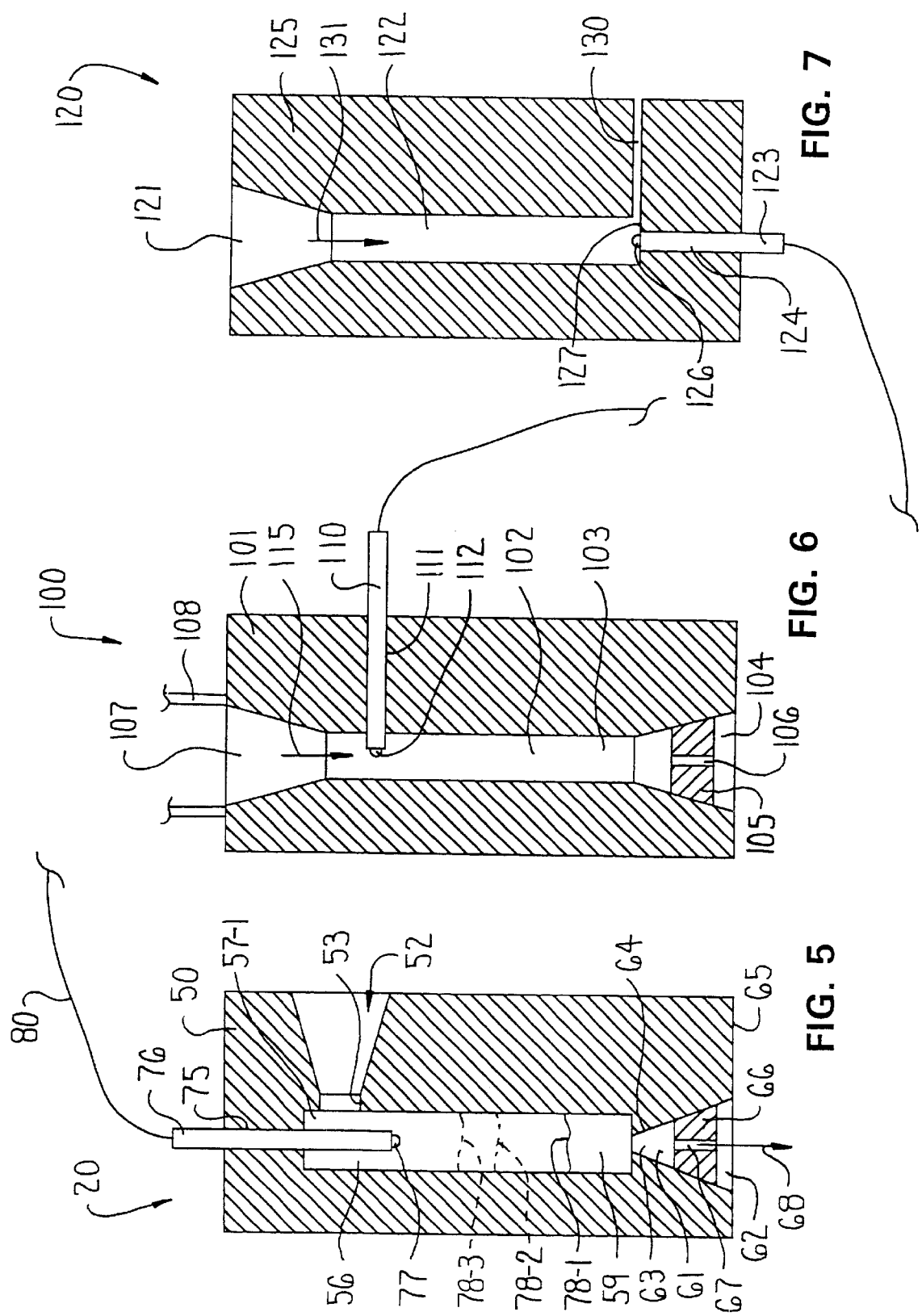

MECHANICAL SEAL LEAK DETECTOR

FIELD OF THE INVENTION

The invention relates to a mechanical seal for sealing a rotating shaft and more particularly, to a mechanical seal having a leak detector for detecting leakage of process fluid from between a pair of relatively rotatable seal rings.

BACKGROUND OF THE INVENTION

Mechanical face seals are used on various types of fluid handling devices or equipment, such as pumps and mixers. Such equipment has a rotating shaft and a process fluid chamber adjacent the shaft wherein the mechanical seal prevents leakage of fluid from the fluid chamber. Typically, such mechanical seals include a pair of adjacent seal rings which have opposing seal faces that define a sealing region radially therebetween to sealingly separate the fluid chamber from an exterior region. One of the seal rings is mounted on the shaft so as to rotate therewith while the other seal ring is non-rotatably mounted on a seal housing.

The seal rings may be provided in different combinations to define a single seal, double seal or tandem seal wherein in the double seals and tandem seals, multiple pairs of seal rings are provided. For example, U.S. Pat. No. 4,560,173 discloses double and tandem seals and U.S. Pat. No. 5,498,007 discloses a double seal. The disclosures of these patents are hereby incorporated by reference in their entirety.

In centrifugal pumps, mechanical seal failure is the most prevalent type of failure. In many services, a seal failure can even have catastrophic results. For example, flammable liquids are sealed in refinery applications and leakage of such process fluid can lead to fires that may cause significant loss of production and equipment as well as personal injuries.

In an effort to reduce the risk of failures, such as for light-hydrocarbon services, tandem mechanical seals may be provided wherein process fluid that leaks past a primary seal defined by a first pair of seal rings adjacent the process fluid chamber is contained by a secondary seal defined by a second pair of relatively rotatable seal rings. This leakage is then removed from a chamber defined between the primary and secondary seals before such leakage is able to migrate across the secondary seal and leak to the ambient environment.

However, end-users continue to use single mechanical seals, such as users in heavy-hydrocarbon services, since single mechanical seals are significantly less expensive. However, if leakage occurs in a single mechanical seal, such leakage is exposed to the ambient environment.

In an effort to identify leakage in single mechanical seals, end-users typically perform visual inspections whether through video cameras, which monitor pump installations, or through manual visual inspections of the seal. Further, pressure switches have been used to detect pressure increases in the gland of the mechanical seal although large leakage rates are required to produce detectable pressure increases. By the time a large amount of leakage is detected, the leakage still may have caused the failure of a shaft bearing associated with the mechanical seal which bearing failure can cause ignition of the fluid leakage.

In view of the foregoing, an object of the invention is to provide a mechanical seal having a leak detector arrangement, particularly in a single mechanical seal, which overcomes the disadvantages associated with known mechanical seals and procedures for detecting leakage therein.

In accord therewith, the invention relates to a mechanical seal having a leak detector associated therewith which readily detects leakage regardless of whether the mechanical seal is a single, double or tandem mechanical seal. In particular, the mechanical seal of the invention preferably relates to a single mechanical seal and the leak detector arrangement associated therewith.

In the seal arrangement of the invention, the mechanical seal includes a seal gland or housing in which the stationary seal ring is seated. A rotatable seal ring is mounted to a rotatable shaft so as to rotate therewith relative to the stationary seal ring. The gland surrounds the seal rings and also defines a chamber on the outboard side of the seal rings. The chamber in a single mechanical seal communicates with the ambient environment and in a double or tandem seal is disposed axially between a secondary set of seal rings. The gland further includes a conventional drain port wherein the leak detector assembly is connected to the drain port and thereby receives process fluid leaking past the seal rings.

The leak detector includes a detector housing having a collection chamber or reservoir, a drain orifice which allows a restricted flow of leakage out of the collection reservoir, and a fiber optic sensor which projects into the reservoir and detects the presence of liquid leakage.

In a first embodiment, the sensor detects a build-up of liquid in the leakage reservoir. In particular, the detector housing includes an inlet port in the side wall thereof wherein leakage flows into the reservoir sidewardly and then falls to the bottom of the reservoir at the restrictor orifice. If the flow rate of leakage into the reservoir is greater than the rate of outflow through the orifice, the leakage collects or builds up within the reservoir and eventually reaches the sensor that is located vertically above the orifice. The detection of fluid by the sensor indicates that the leakage has exceeded an acceptable flow rate, i.e. the outflow rate, thereby indicating impending or actual failure of the mechanical seal.

In a second embodiment, the inlet port of the detector housing is located at the top thereof while the tip of the sensor is located within the reservoir directly below the inlet port. The leakage flows into the reservoir through the inlet and drips onto the sensor tip whereby the sensor tip is able to count the drops striking the tip.

In a third embodiment, the sensor may be provided at the bottom of the reservoir housing directly adjacent to an outlet port that extends sidewardly through the housing side wall. This sensor operates similar to the second embodiment in that the sensor tip thereof is contacted by drops of leakage and thereby is used to count the rate of the drops which provides an indication of the leakage rate.

With these leakage detector arrangements, the flow rate of leakage can be detected. These leakage detectors are particularly suited for detecting low leakage rates so that leakage can be identified before a catastrophic failure condition is reached.

Other objects and purposes of the invention, and variations thereof, will be apparent upon reading the following specification and inspecting the accompanying drawings.

BRIEF DESCRIPTION OF THE DRAWINGS

FIG. 5 is a cross-sectional view of a first embodiment of the leak detector.

FIG. 6 is a cross-sectional view of a second embodiment of the leak detector.

FIG. 7 is a cross-sectional view of a third embodiment of the leak detector.

Figure 1:
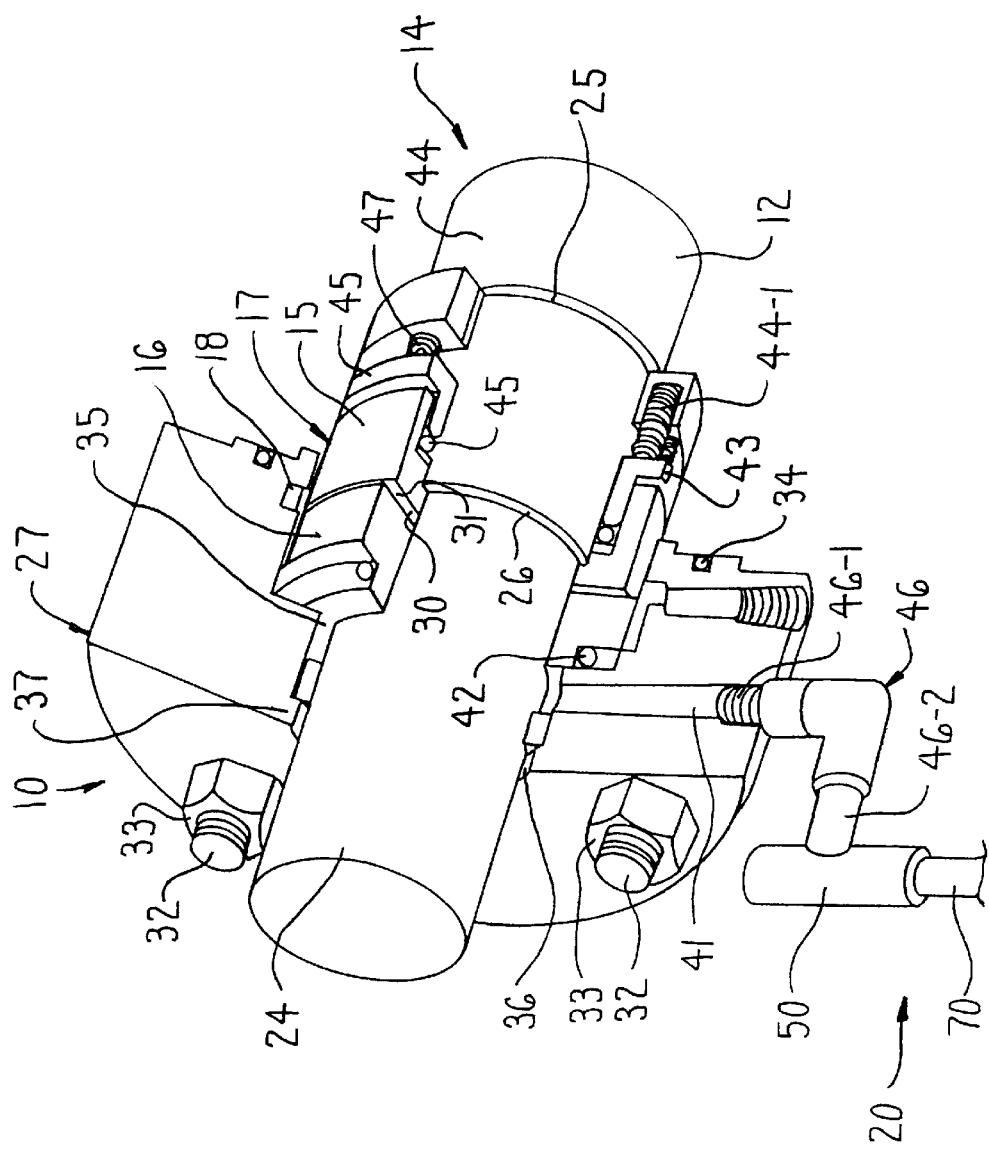
FIG. 1 is a cut-away front perspective view of a mechanical seal and a leak detector therefor.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, a mechanical face seal 10 of the invention is mounted on a rotatable shaft 12 of a machine 14, such as a pump, mixer or other liquid handling unit. The mechanical seal 10 includes a pair of concentric, relatively rotatable seal rings 15 and 16 which effectively seal a process fluid 17 within a process fluid chamber 18 of the machine 14. The mechanical seal 10 further includes a leak detector assembly 20 which is adapted to collect and detect undesirable leakage occurring between the seal rings 15 and 16.

Figure 2:
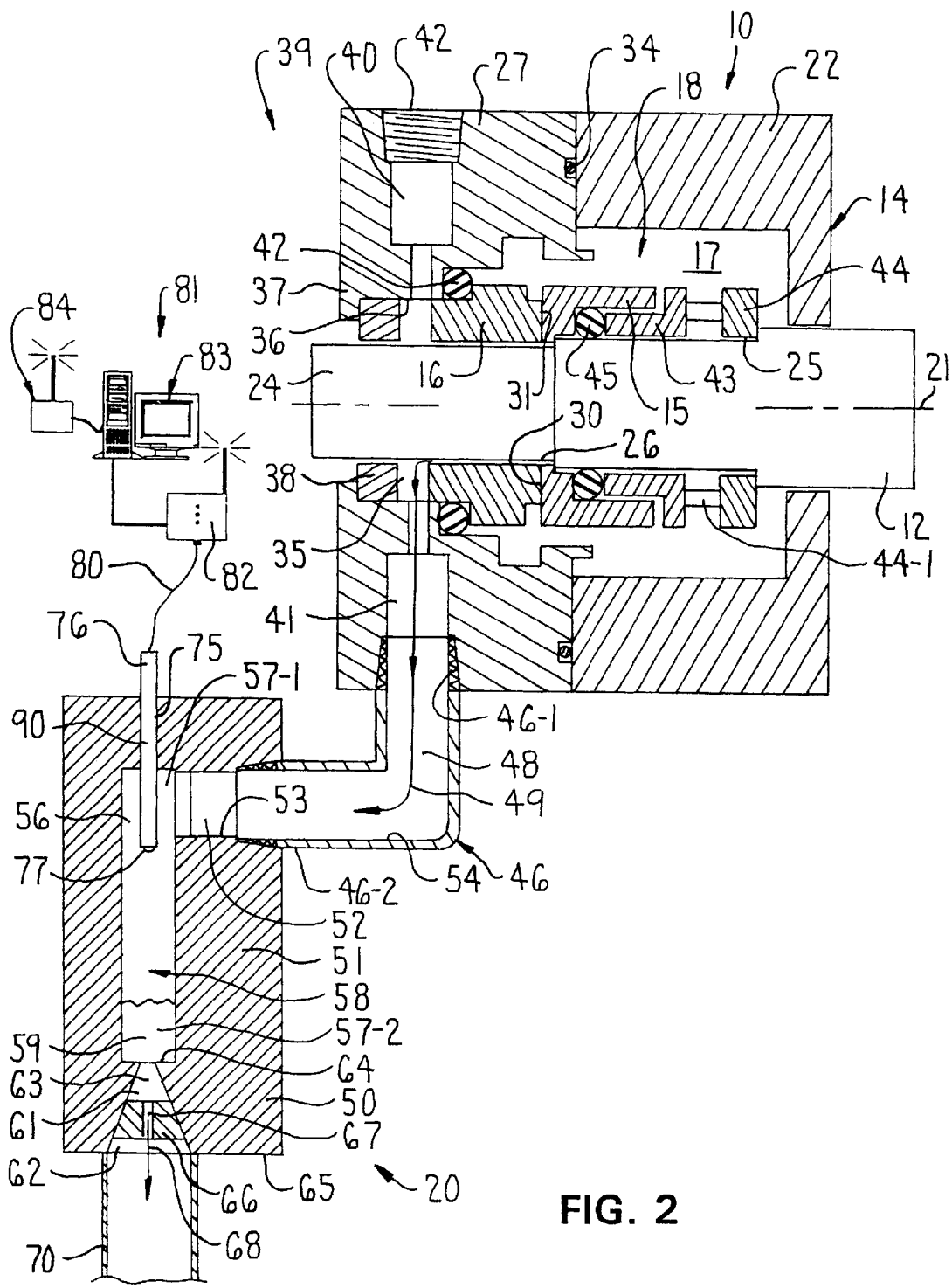
FIG. 2 is a cross-sectional view of the mechanical seal.
Figure 3:
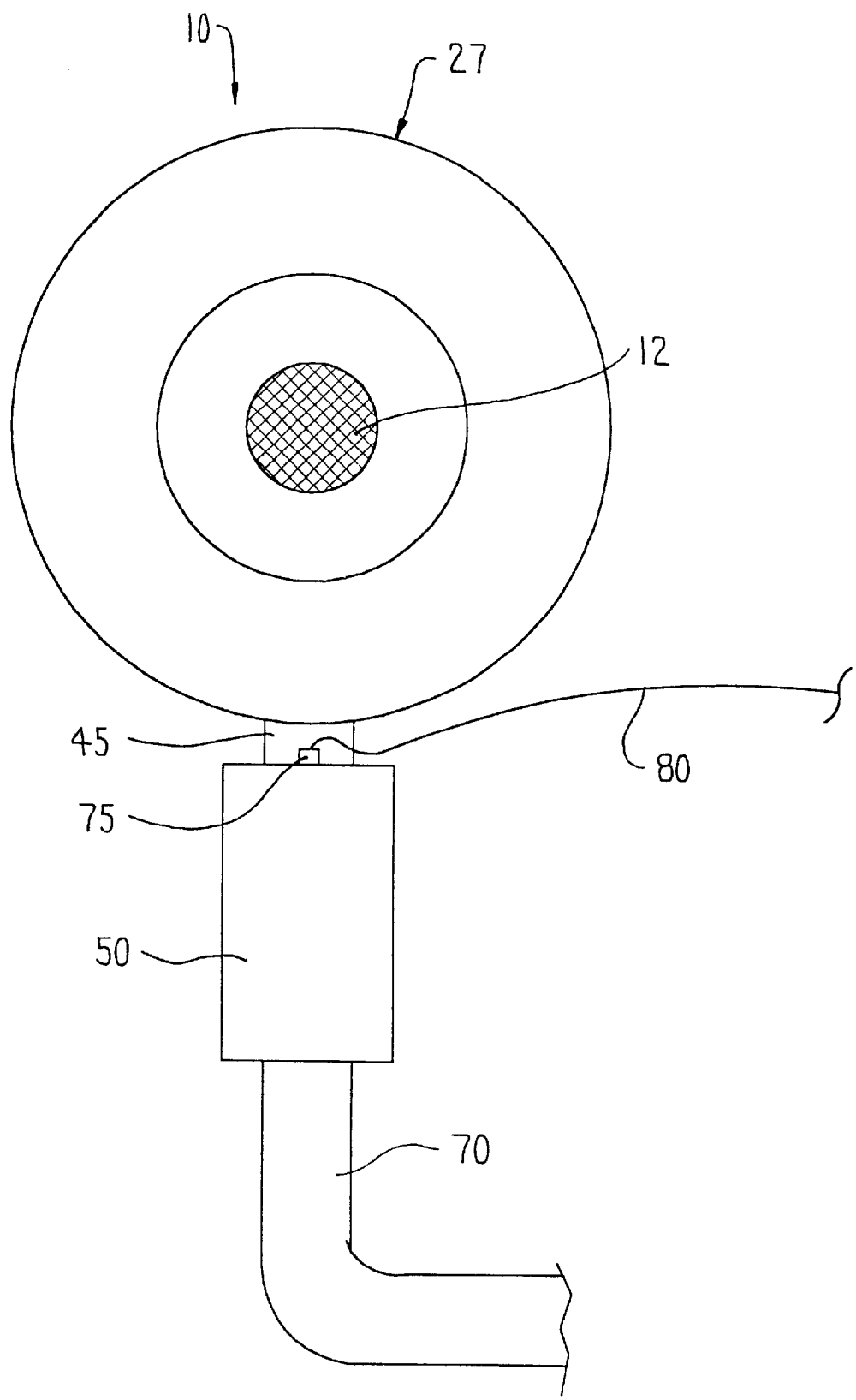
FIG. 3 is an end elevational view of the mechanical seal.

More particularly, the machine 14 may be any type of fluid handling equipment having a rotatable shaft 12 therein, wherein the shaft 12 is driven by a motor located on the outboard shaft end. The shaft 12 is rotatable about a central axis 21 (FIG. 2).

The machine 14 includes an annular machine housing 22 (FIG. 2) which surrounds the inboard end of the rotating shaft 12 in radially spaced relation to define the process fluid chamber 18. When the equipment 14 is a pump, the shaft 12 typically is connected to or drives an impeller that pumps the process fluid 17.

The shaft 12 has a conventional circular cross-section defined by an outer circumferential shaft surface 24 wherein the shaft 12 rotates relative to the machine housing 22. The shaft 12 in the illustrated embodiment of the invention has reduced diameter portions which define an inboard shoulder 25 and an outboard shoulder 26. The inboard and outboard shoulders 25 and 26 are defined by radially extending surfaces which face axially.

It will be understood that the construction and arrangement of the shaft 12 may vary depending upon the specific construction of the machine 14. Accordingly, the construction of the mechanical seal 10 described hereinafter also may be modified for use with alternate structural arrangements for the shaft 12.

Generally relative to the mechanical seal 10, the rotatable seal ring 15 is mounted to the shaft 12 and accordingly, rotates therewith. The stationary seal ring 16 is non-rotatably mounted to a seal gland or housing 27. The rotatable seal ring 15 and the stationary seal ring 16 therefore are relatively rotatable, and as seen in FIG. 2, include respective seal faces 30 and 31 which face axially toward each other in opposing relation to define a sealing region therebetween. The sealing region is defined radially across the seal faces 30 and 31 and prevents or at least minimizes leakage of the process fluid 17 across the sealing region during shaft rotation. The seal rings 15 and 16 may be formed to provide contacting or non-contacting operation.

Referring to FIGS. 1 and 2, as to the individual components of the mechanical seal 10, the gland 27 has an annular shape and is bolted to the machine housing 22 (FIG. 2) by threaded lugs 32 and nuts 33. The seal gland 27 and machine housing 22 further have an annular gasket 34 confined therebetween to preclude leakage. The gland 27 is spaced radially outwardly of the outer shaft surface 22 and defines an annular quench chamber 35 which is located radially between an inward-facing circumferential surface 36 of the seal gland 27 and the opposing shaft surface 24.

The seal gland 27 also includes a stop flange 37 which projects radially inwardly from the gland surface 36 at the outboard edge thereof. An annular restricting ring 38 is provided adjacent the stop flange 37 wherein the restricting ring 38 reduces the size of the passage between the exterior or ambient environment 39 of the mechanical seal 10 and the quench chamber 35. However, the quench chamber 35 still is in open communication with the ambient environment 39 in this single mechanical seal arrangement. It will be understood that in alternate seal configurations, the restricting ring 38 may be replaced by an additional pair of relatively rotatable seal rings to define either a tandem configuration or a double seal configuration.

The seal gland 27 further includes a pair of drain ports 40 and 41 which define passages that extend radially inwardly into the gland chamber 35. The uppermost one of the drain ports 40 is capped by a plug 42 or steam is applied thereto while the lowermost one of the drain ports 41 is connected to the leak detector assembly 20 as will be described in greater detail hereinafter.

The non-rotatable seal ring 16 is non-rotatably connected to the seal gland 27 and includes a secondary seal defined by an O-ring 42. The O-ring 42 prevents passage of the process fluid 17 from the process fluid chamber 18 into the quench chamber 35 through the space between the seal ring 16 and the seal gland 27.

As to the rotatable seal ring 15, the seal ring 15 is mounted non-rotatably to the shaft 12 by a compression ring 43 so that the seal ring 15 rotates in unison with the shaft 12. The compression ring 43 is axially movable toward and away from a collar 44 in a conventional manner. In particular, the collar 44 is disposed adjacent the inboard shoulder 25 and is held in place by set screws wherein circumferentially spaced apart springs 44-1 are compressed axially between the collar 44 and the compression ring 43 to press or bias the compression ring 43 axially towards the seal ring 16. An O-ring 45 is compressed between a back face of the seal ring 15 to seal the space between the seal ring 15 and the shaft 12 and prevent leakage of process fluid 17 through this region.

With the above mechanical seal 10, the opposed pair of seal rings 15 and 16 are relatively rotatable yet in sealing engagement with each other. During normal operation, the cooperating seal faces 30 and 31 prevent the liquid 17 from leaking into the quench chamber 35, although in some cases, a minimal, acceptable amount of leakage may occur. However, eventually the seal faces 30 and 31 may begin to wear or deteriorate, possibly due to upset conditions occurring in the equipment 14 or even due to corrosion caused by the process fluid 17. As a result, leakage into quench chamber 35 will increase. Not only is it undesirable to allow such leakage to be exposed to or leak to the ambient environment, but such leakage can also indicate that complete or even catastrophic seal failure may soon occur. The leak detector 20, however, detects such leakage at relatively low levels and monitors the rate of such leakage.

Referring to FIGS. 1 and 2, the leak detector assembly 20 includes a right-angled pipe fitting 46 which is threadedly engaged with the drain port 41. The pipe fitting 46 includes a threaded upper end 46-1 which is threaded into the open end of the drain port 41 and includes a second threaded end 46-2 which projects sidewardly in the embodiment of FIGS. 1 and 2. The pipe fitting 46 defines a hollow passage 48 through which any process fluid leakage from the gland chamber 35 is able to pass downwardly and then sidewardly as generally indicated by reference arrow 49. The pipe end 46-1 may be threadedly engaged with existing drain ports on various mechanical seals. Accordingly, the leak assembly 20 may be mounted to the illustrated seal 10 or to other known seal arrangements.

The second pipe end 46-2 is fixedly attached with a detector housing 50. The detector housing 50 includes an annular side wall 51 wherein the side wall 51 includes a horizontal inlet passage 52 which opens sidewardly through the side wall 51. The inlet passage 52 receives the second pipe end 46-2 in threaded engagement therewith and includes an interior surface 53 which extends substantially continuously or flush with the interior surface 54 of the pipe fitting 46 to define an extension of the passage 48.

The detector housing 50 further includes a vertically elongate interior chamber 56 having an upper chamber area 57-1 which is located proximate the inlet port 52. The lower end 57-2 of the chamber 56 defines a leakage reservoir 58 in which process fluid leakage 59 is collected.

The detector housing 50 further includes a vertical bore 61 having a lower open end section 62 and an upper end section 63. The upper end section 63 opens upwardly through a bottom wall 64 of the leakage reservoir 58 and is adapted to allow the fluid leakage 59 to flow downwardly therethrough.

The lower end section 62 defines an extension of the upper passage 63 and opens downwardly through a bottom surface 65 of the housing 50. The lower passage 62 includes an annular restrictor insert 66 which is fixed therein and includes a small vertical orifice 67. The orifice 67 defines a restricted flow passage which allows a limited restricted flow of the fluid leakage 59 out of the detector housing 50 as indicated by reference arrow 68. The orifice 67 alternately could open horizontally through the side wall 51.

This restricted fluid flow passes into a discharge pipe 70 which is in open communication with the lower passage 62. The discharge pipe 70 may be part of a closed loop system wherein the fluid leakage received in the discharge pipe 70 is returned in a closed loop back to the liquid handling system to avoid waste of the fluid leakage. Alternatively, particularly for non-volatile liquids, the discharge pipe 70 may open into a drain reservoir and the fluid leakage then discarded which is the most simple installation particularly when the leak detector 20 is installed on existing equipment.

The detector housing 50 further includes a sensor bore 75 which opens downwardly through the thickness of the detector housing 50 into the chamber 56 above the inlet port 52.

Generally, the sensor bore 75 tight-fittingly receives a fluid sensor 76 which sensor 76 projects into the interior chamber 56. The tip 77 of the sensor 76 is adapted to detect the presence of the fluid leakage 59 and is located at an elevation in the chamber 56 below a bottom edge of the inlet passage 52. In operation, the fluid leakage passes through the inlet pipe 46 in an unrestricted flow. If the inflow through the inlet pipe 46 exceeds the restricted flow rate permitted by the exit orifice 67, the fluid leakage 59 collects and builds up within the fluid reservoir 58.

Referring to FIG. 5, as the fluid leakage 59 builds up, the level indicated by reference line 78-1 progressively increases as indicated by references lines 78-2 and 78-3. Ultimately, the fluid level reaches the sensor tip 77 such that the build up of fluid leakage 59 generates a sensor signal as described in further detail hereinafter.

More particularly, the sensor 76 is connected to a sheathed sensor cable 80 which leads to and is connected to a control system 81 (FIG. 2). Generally, the control system 81 includes a fiber optic sensor unit 82 which is connected to a computer 83. The computer 83 receives a signal from the sensor unit 82 and determines whether leakage is excessive or not. The computer 83 may be connected directly to the fluid handling equipment to control shutdown of the fluid handling equipment in response to detection of excessive leakage. Further, the computer 83 may also be connected to a signaling unit 84 which generates or transmits a warning signal to notify operators that leakage is excessive.

Figure 4:
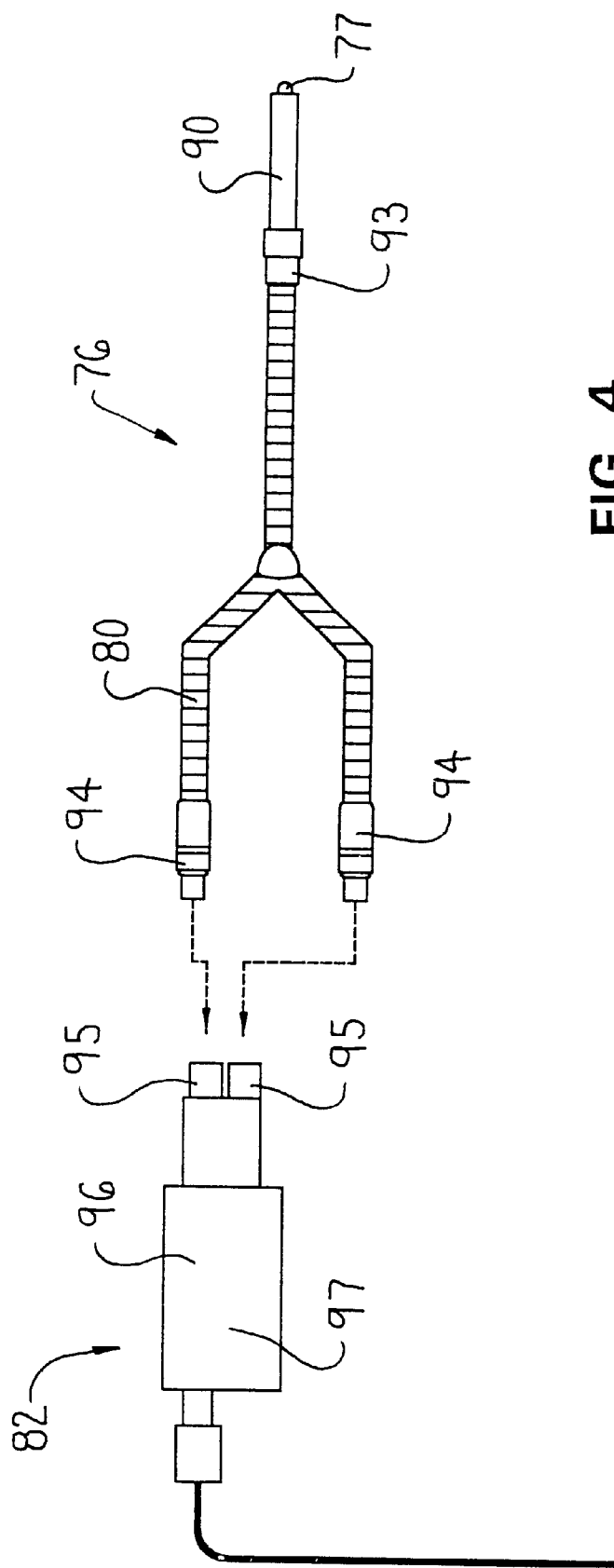
FIG. 4 is an exploded view of a leak sensor and associated control unit therefor.

Referring to FIG. 4, the sensor 76 preferably comprises a fiber optic probe 90 which fits into the sensor bore 75 of the detector housing 50. The free end of the probe 90 includes the fiber optic sensor tip 77 which is exposed and is adapted to measure the refractive index of any materials located on the sensor tip 77. The probe is connected to the fiber optic cable 80 having a first connector 93 which is mechanically connected to the probe 90. The fiber optic cable 80 also includes separate end connectors 94 which are adapted to connect to respective terminals 95 on a control module 96 as will be described in further detail hereinafter. The sheathed cable 80 is adapted to transmit light therethrough to the sensor tip 77.

The control module 96 includes an LED circuit which preferably provides 850 NM light at a constant intensity to the sensor tip 77 through the fiber optic cables 80. The control module 96 also includes a detector circuit that generates a DC voltage output which output has a magnitude that corresponds to the refractive index of the medium or material being detected or sensed at the sensor tip 77. Therefore, as the material at the sensor tip 77 changes, such as from air when the leakage reservoir 58 is empty to the process fluid 17 when the fluid level reaches the sensor tip 77, the sensor 76 senses the different refractive indexes thereof. The detector circuit reacts to this change in refractive index being detected and modifies the DC voltage output being generated in the control module 96.

Preferably, the control unit 82 includes a sensitivity potentiometer 97 to adjust the sensitivity of the sensor 76 and thereby calibrate the sensor 76 depending upon the materials being detected. This signal thereby is transmitted to the control computer 83 for either direct control of the fluid handling equipment or generation of a warning signal.

With this arrangement, the sensor 76 is used to either detect an acceptable leakage condition, when the fluid leakage 59 is disposed below the sensor tip 77, and an unacceptable leakage condition when the fluid level reaches the sensor tip and a change in the refractive index of the fluid leakage 59 is detected by the control module 96.

Referring to FIG. 6, an alternate leakage detector assembly or unit 100 is illustrated. This leakage detector 100 includes a detector housing 101 having an interior chamber 102 which defines a fluid leakage reservoir 103 at the bottom end thereof. The lower end of the detector housing 101 includes a bore 104 and an orifice insert 105 at the bottom thereof which are formed substantially identical to the bore 62 and insert 66 of the leakage detector 18. This insert 105 includes a restricted orifice 106 which is the same as the orifice 68 and thereby serves to restrict the outflow rate of fluid from the interior chamber 102.

The detector housing 101 differs from the detector housing 50 in that a vertical inlet passage 107 is provided at the upper end thereof which is connected to a pipe fitting 108. Unlike the pipe fitting 46 and the inlet 52 in the embodiment of FIG. 2, the outlet pipe 108 and inlet passage 107 of FIG. 6 allow for fluid leakage to flow vertically downwardly into the interior chamber 102 rather than sidewardly as occurs within the chamber 58. A sensor probe 110 is fitted into a sensor bore 111 in the detector housing 101 wherein the sensor tip 112 of the sensor probe 110 is disposed approximately at the axial center of the housing chamber 102.

The probe 110 and the sensor tip 112 are formed identical to the probe 90 and sensor tip 77 with the primary difference being that the probe 110 is oriented sidewardly rather than vertically.

The sensor tip 112 is exposed but still is adapted to detect changes in the refractive index of the material surrounding the sensor tip 112. With this arrangement, fluid leakage identified diagrammatically by reference arrow 115 flows downwardly into the chamber 110. Due to the small leakage rate, the fluid leakage only drips one drop at a time onto the sensor tip 112.

The fiber optic probe 110 detects each of these individual drops of fluid leakage which generates intermittent signals in the control module 96. The computer 83 is connected thereto and serves to count the number of fluid leakage drops during a specified period. As such, a fluid leakage rate can be determined based upon the number of leakage drops being counted.

The computer 83 thereby monitors the fluid leakage rate. When the actual fluid leakage rate detected by the probe 110 exceeds a threshold leakage rate, then the computer 83 can either generate a warning signal or control the shutdown of the fluid handling equipment.

Referring to FIG. 7, a further leakage detector 120 is illustrated which is a modified form of the detector assembly 100. The detector assembly 120 includes an upper inlet port 121 and a fluid chamber 122 which are formed substantially the same as the inlet port 107 and the fluid chamber 102 described above. In this arrangement of FIG. 7, however, a probe 123 is provided in a vertical bore 124 formed in the detector housing 125. The probe 123 includes a sensor tip which projects through a bottom surface 127 of the interior chamber 122 and thereby is exposed upwardly for detection of a fluid flowing over the bottom surface 127. An outlet orifice 130 is provided adjacent to the bottom surface 127 and is oriented sidewardly to provide an exit passage for any fluid leakage. The sensor tip 126 is located at the axial center of the bottom surface 127 and similar to the probe 110, is provided to count the number and rate of leakage drops which drip directly downwardly onto the sensor tip 126. The leakage flow is generally identified by reference arrow 131. In the same manner as the leakage detector assembly 100, the detector assembly 120 counts leakage drops to calculate the flow rate and can generate a warning signal or control the fluid handling equipment once the flow rate of the leakage drops 131 exceeds a threshold value.

With the above described arrangement, the mechanical seal 10 can be provided with any of the leakage detector assemblies 20, 100 or 120 and therefore during installation, the mechanical seal 10 is adapted to detect fluid leakage occurring across the seal rings 15 and 16.

The mechanical seal 10 can include the detector assembly 20 although it is understood that by modifying the inlet pipe 46, the alternate detector assemblies 100 or 120 may also be used. With respect to the detection principles, the leakage detector assembly 20 of FIG. 5 allows for a fixed rate of fluid flowing through the orifice 68. When the rate of leakage entering the detector housing 50 through the inlet port 52 exceeds the outflow rate, then the fluid levels build up as indicated by arrows 78-2 and 78-3 until such time as a change in the refractive index is detected at the sensor tip 77. Alternately, the detector assemblies 100 and 120 of FIGS. 6 and 7 respectively allow for continuous monitoring of the leakage flow rate and control of the fluid handling equipment when the leakage flow rate exceeds a threshold limit. With all of the foregoing arrangements, threshold leakage rates can be varied.

Further, if other materials such as steam or fluid are used in the gland chamber to heat or cool the gland area, the sensor 76 can be set to disregard the refractive index and instead be set to detect only a specific fluid having a unique refractive index.

Figure 8:
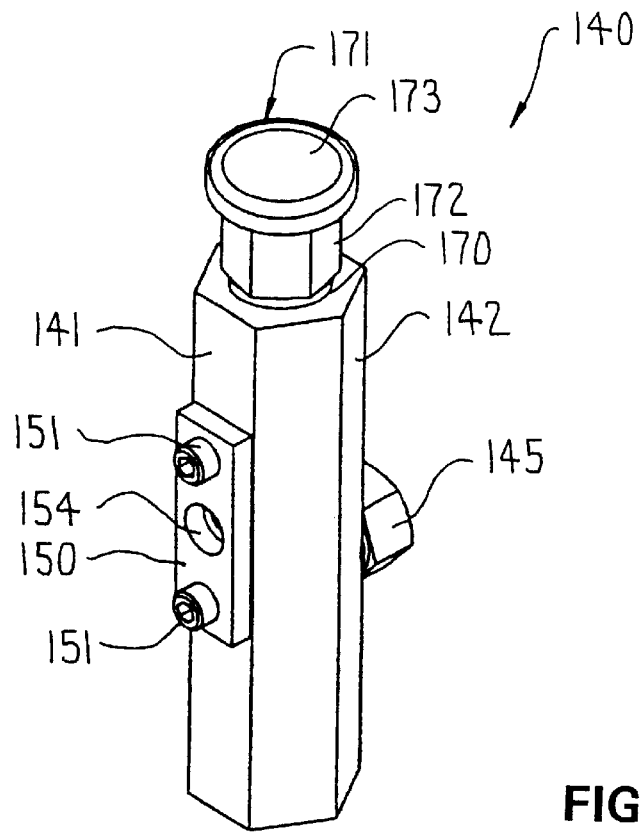
FIG. 8 is a perspective view of a preferred fourth embodiment of the leak detector.
Figure 9:
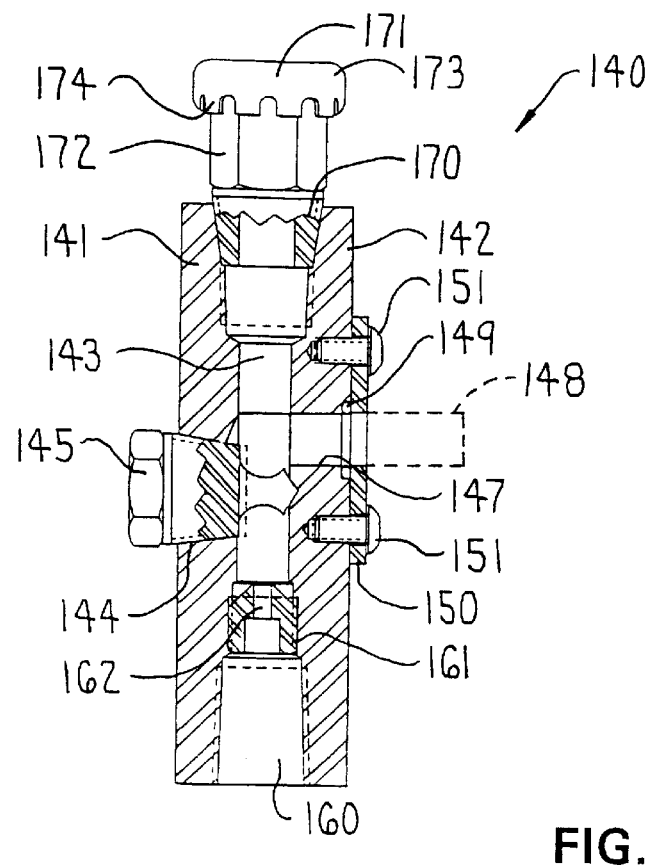
FIG. 9 is a cross-sectional view of a preferred fourth embodiment of the leak detector.

Referring to FIGS. 8 and 9, a preferred leakage detector 140 is illustrated therein. The leakage detector 140 is reversible to permit detection by either detecting a build-up of fluid leakage similar to the embodiment of FIG. 5 or by continuous monitoring of the leakage flow rate similar to the embodiment of FIG. 6.

More particularly, the leakage detector assembly 140 includes a generally tubular detector housing 141 defined by an annular side wall 142 and a central passage 143 extending entirely therethrough. The side wall 142 includes an inlet passage 145 which in the illustrations of FIGS. 8 and 9 includes a threaded plug 145 therein.

The side wall 142 further includes a sensor bore 147 which extends sidewardly through the side wall 142 and is adapted to receive a fiber optic sensor 148 therein. The sensor 148 is structurally and functionally the same as the sensor 76 and thus, further discussion thereof is not required. The sensor 148 is sealingly engaged with the sensor bore 147 by way of an annular elastomeric O-ring 149. Further, a rectangular retaining plate 150 is fastened to the detector housing 141 by screws 151. The retaining plate 150 includes an opening 154 which is in registry with the sensor bore 147 and receives the sensor 148 therethrough. The retaining plate thereby maintains the sensor 148 in a sidewardly projecting orientation where the tip of the sensor 148 projects into the central bore 143 of the detector housing 141. Therefore, the sensor 148 is oriented sidewardly similar to the sensor 110 in the embodiment of FIG. 6 but in this orientation also is capable of functioning the same as the sensor 76 in the embodiment of FIG. 5.

The central passage 143 includes a first open end 160 which is adapted to receive an orifice 161 therein. The orifice 161 includes a restricted passage 162 which limits the flow of fluid leakage out of the central passage 143. In the orientation illustrated in FIGS. 8 and 9, the detector housing 141 is provided without the plug 145 and instead, the inlet port 144 is connected to a threaded pipe fitting 46. As such, fluid leakage from a mechanical seal 10 passes into the central passage 143 through the inlet port 144. When the flow of the fluid leakage into the interior chamber 143 exceeds the rate of flow out of the chamber 143 through the restricted orifice 162, then the fluid leakage builds up within the central passage 143. Once the fluid leakage builds up sufficiently, the fluid leakage will contact the sensor 148 to provide an indication that the fluid leakage in the mechanical seal 10 has exceeded a desirable level. Therefore, the embodiment of FIGS. 8 and 9 functions substantially the same as the embodiment of FIG. 5.

The central passage 143 further includes an opposite end opening 170 which is adapted to receive a vent fitting 171 therein. The vent fitting 171 allows for the discharge of air from the central passage 143 during fluid build-up in order to prevent the detector housing 141 from being air locked. The vent fitting is a breather type fitting and is commercially available. The vent fitting 170 includes a threaded body 172 which is threadedly engaged with the passage opening 170. The fitting body 172 further includes a movable cap 173 which seats on the upper end of the fitting body 172 and closes off the open upper end thereof during normal use. However, the vent cap 173 also is vertically movable upon the build-up of air pressure within the detector housing 141 whereby downwardly projecting fingers 174 retain the cap 173 on the body 172 but also allow for the passage of air therefrom when the cap 173 lifts upwardly during a pressure release. The cap 173 is desirable since it prevents contaminants and debris from falling into the central passage 143.

In addition to the foregoing, the leakage detector assembly 140 may be rotated 180 degrees about its central horizontal axis to reverse the orientation of the passage ends 160 and 170. This permits the leakage detector assembly 140 to operate substantially the same as the detector assembly 100.

More particularly, when rotated to this second operative position, the plug 145 is threadedly engaged with the inlet port 144 to block off the inlet port 144. Furthermore, the vent fitting 171 is removed from the passage end 170 wherein the passage end 170 thereby serves as an exit port for fluid leakage. The detector housing 141 is supported by threadedly engaging the passage opening 160 with a downwardly extending pipe fitting wherein the detector housing 141 projects downwardly therefrom.

In this second operative position, the passage end 160 now is oriented upwardly wherein the orifice 161 now serves to restrict the flow of fluid leakage downwardly into the central passage 143. Specifically, the orifice 161 is selected so that the restricted passage 162 thereof causes fluid leakage to flow slowly therethrough and thereby form drops of fluid leakage which drop one at a time onto the sensor tip of the sensor 148. The orifice 161 and specifically, the restricted passage 162 thereof is selected and may be varied depending upon the fluid leakage which is being encountered so that the restricted passage size can be increased or decreased to cause formation of drops of fluid leakage as opposed to a continuous flow of fluid leakage therethrough. The sensor 148 is connected to a suitable control unit to thereby count the rate of the leakage drops and thereafter, the drops of fluid leakage fall from the sensor tip and exit the detector housing 141 through the passage end 170. As can be seen, the embodiment of FIGS. 8 and 9 is usable in two different operative orientations to permit detection of fluid leakage either by detecting the build-up of the fluid leakage or monitoring the leakage flow rate.

The sensor 148 is provided in combination with a suitable control unit. One example of a suitable control unit is a control system that is commercially available from Innovative Sensor Solutions, Ltd. of Houston, Tex. which system is sold under the trademarks FILLCHECK® and FUELCHECK®. This commercial system provides a transmitter which is directly connected to the sensor and controller which sends a signal to an alarm logic control unit for managing the signals received from the transmitter and providing suitable warning indicators. The alarm manager may be connected to suitable audio or visual alarms or to a computer system for controlling the overall system to which the mechanical seal is connected.

With the foregoing arrangement, a mechanical seal 10 is provided which has an effective leakage detector assembly connected thereto.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. In a mechanical seal having a gland surrounding a rotatable shaft in radially spaced relation therewith, said mechanical seal including a seal arrangement cooperating between said gland and said shaft to sealingly separate first and second regions disposed along said shaft, said first region being a process fluid chamber containing a liquid process fluid, and said second region being a gland chamber disposed adjacent said seal arrangement so as to receive fluid leakage of said process fluid from said second region, said gland further including a drain port which is in open communication with said gland chamber for receiving any said fluid leakage, comprising the improvement wherein said mechanical seal includes a leak detector assembly which includes a detector housing having a leakage chamber and an inlet passage, said inlet passage being in open communication with said drain port and said leakage chamber to permit any of said fluid leakage to flow therethrough into said leakage chamber, said leak detector assembly further including a fiber optic sensor unit which comprises a sensor probe that is mounted on said detector housing, said sensor probe including a sensor tip which is positioned to detect the presence of said fluid leakage within said leakage chamber through contact of said sensor tip with said fluid leakage, said fiber optic sensor unit including a control unit and said sensor probe being operatively connected to said control unit, said sensor tip detecting a refraction index of fluid material surrounding said sensor tip wherein said fiber optic sensor unit generates a first signal corresponding to a refraction index of a surrounding fluid material within said fluid chamber which surrounds said sensor tip in contacting relation therewith during normal mechanical seal operation and generating a second signal corresponding to a refraction index of said fluid leakage within said leakage chamber when said fluid leakage contacts said sensor tip, said control unit detecting said first and second signals and generating an output signal which changes when said fiber optic sensor is contacted by said fluid leakage adjacent said sensor tip and indicates a flow rate of said fluid leakage.

2. The mechanical seal according to claim 1, wherein said detector housing has a fixed exit orifice which allows for a restricted flow of fluid leakage out of said leakage chamber at a fixed orifice flow rate.

3. The mechanical seal according to claim 2, wherein said sensor tip is spaced vertically above a bottom surface of said leakage chamber wherein a level of fluid leakage within said leakage chamber rises when the flow rate of said fluid leakage exceeds said orifice flow rate.

4. The mechanical seal according to claim 3, wherein said fiber optic sensor detects said fluid leakage when the level of said fluid leakage reaches and contacts said sensor tip.

5. The mechanical seal according to claim 1, wherein said sensor tip is disposed within said detector housing directly below an inlet port wherein said fluid leakage drips onto said sensor tip in contact therewith.

6. The mechanical seal according to claim 5, wherein said second signal is generated each time a drop of said fluid leakage contacts said sensor tip.

7. The mechanical seal according to claim 6, wherein said control unit determines the flow rate of said fluid leakage by counting the rate of said drops.

8. The mechanical seal according to claim 1, wherein said detector housing includes a sensor bore which has an open inner end that opens into said leakage chamber, said sensor probe being mounted in said sensor bore with said sensor tip being disposed within said open inner end to permit contact with said fluid leakage.

9. In a mechanical seal having a gland surrounding a rotatable shaft in radially spaced relation therewith, said mechanical seal including a seal arrangement cooperating between said gland and said shaft to sealingly separate first and second regions disposed along said shaft, said first region being a process fluid chamber containing a liquid process fluid, and said second region being a gland chamber disposed adjacent said seal arrangement to receive leakage of said process fluid from said second region, said gland further including a drain port which is in open communication with said gland chamber for receiving any said fluid leakage, comprising the improvement wherein said mechanical seal includes a leak detector assembly which has a detector housing having a leakage chamber and an inlet passage, said inlet passage being in open communication with said drain port and said leakage chamber to permit any of said fluid leakage to flow into said leakage chamber, said leak detector further including a fiber optic sensor which has a sensor section disposed within said leakage chamber to permit contact with fluid within said leakage chamber, said sensor section communicating with a control module through a fiber optic cable connected therebetween, said sensor section detecting an index of refraction of any fluid material within said leakage chamber surrounding said sensor section in contacting relation therewith, said control module receiving a first signal from said sensor section wherein said first signal corresponds to a surrounding fluid material other than said process fluid and said second signal corresponds to an index of refraction of said fluid leakage.

10. The mechanical seal according to claim 9, wherein said sensor section is disposed away from a flow path of said fluid leakage into said leakage chamber, said detector housing having an exit orifice which permits a restricted flow of said fluid leakage out of said leakage chamber at a restricted flow rate, said fluid leakage building up within said leakage chamber when said flow rate of said fluid leakage exceeds said restricted flow rate wherein said sensor section detects said fluid build-up.

11. The mechanical seal according to claim 10, wherein said sensor section is sidewardly spaced from and disposed below said inlet passage.

12. The mechanical seal according to claim 9, wherein said sensor section detects a build-up of fluid leakage within said leakage chamber.

13. The mechanical seal according to claim 9, wherein said sensor section detects a flow rate of said fluid leakage into said leakage chamber.

14. The mechanical seal according to claim 9, wherein said detector housing has an inlet pipe which defines said inlet passage, a distal end of said inlet pipe being mechanically connected to said drain port to support said leak detector assembly on said gland.

15. In a mechanical seal having a gland surrounding a rotatable shaft in radially spaced relation therewith, said mechanical seal including a pair of relatively rotatable first and second seal rings wherein said first seal ring is non-rotatably mounted to said gland and said second seal ring is mounted on said shaft so as to rotate therewith, said first and second seal rings having opposing seal faces which cooperate with each other to sealingly separate first and second regions disposed along said shaft, said first region being a process fluid chamber containing a liquid process fluid, and said second region being a gland chamber disposed adjacent said first and second seal rings so as to receive leakage of said process fluid from said seal faces, said gland further including a drain port which is in open communication with said gland chamber for receiving any said fluid leakage, comprising the improvement wherein said mechanical seal includes a leak detector assembly which is mounted to said drain port, said leak detector assembly comprising an inlet pipe which has a first end mechanically connected to said drain port and a second end to which is connected a hollow detector housing, said detector housing having a side wall which defines a fluid chamber and includes an inlet passage which is in open communication with said drain port through said inlet pipe to permit any of said fluid leakage to flow into said fluid chamber, said detector housing having a sensor bore which opens into said fluid chamber and said leak detector assembly further including a fiber optic sensor having a fiber optic probe which is supported on said detector housing within said sensor bore, said fiber optic probe having a sensor section received by said sensor bore which is exposed within said fluid chamber to permit contact between said sensor section and said fluid leakage, said sensor section detecting an index of refraction of any fluid material within said fluid chamber surrounding said sensor section and detecting whether said fluid leakage is disposed in contact with said sensor section, said sensor section being spaced from said fluid leakage as said fluid leakage flows into said fluid chamber so as to detect said fluid leakage only upon a build-up of fluid leakage within said fluid chamber.

16. The mechanical seal according to claim 15, wherein said detector housing has an exit orifice which permits a restricted flow of said fluid leakage to flow out of said fluid chamber at a restricted fixed flow rate, said build-up of fluid leakage occurring when a flow rate of said fluid leakage into said fluid chamber exceeds said restricted flow rate.

17. The mechanical seal according to claim 16, wherein said sensor section is spaced vertically above said exit orifice and vertically below said inlet passage.

18. The mechanical seal according to claim 16, wherein said sensor section is spaced sidewardly from said flow path of said fluid leakage.

19. In a mechanical seal having a gland surrounding a rotatable shaft in radially spaced relation therewith, said mechanical seal including a pair of relatively rotatable first and second seal rings wherein said first seal ring is non-rotatably mounted to said gland and said second seal ring is mounted on said shaft so as to rotate therewith, said first and second seal rings having opposing seal faces which cooperate with each other to sealingly separate first and second regions disposed along said shaft, said first region being a process fluid chamber containing a liquid process fluid, and said second region being a gland chamber disposed adjacent said first and second seal rings so as to receive leakage of said process fluid from said seal faces, said gland further including a drain port which is in open communication with said gland chamber for receiving any said fluid leakage, comprising the improvement wherein said mechanical seal includes a leak detector assembly which is mounted on said drain port, said leak detector assembly comprising an inlet pipe which has a first end mechanically connected to said drain port and a second end to which is connected a hollow detector housing, said detector housing having a side wall which defines a fluid chamber and includes an inlet passage which is in open communication with said drain port through said inlet pipe to permit any of said fluid leakage to flow into said fluid chamber, said leak detector further including a fiber optic sensor having a fiber optic probe which is supported on said detector housing and has a sensor section which is disposed within said fluid chamber, said sensor section detecting an index of refraction of any fluid material surrounding said sensor section and detects whether said fluid leakage is disposed in contact with said sensor section, said sensor section being disposed within a flow path of said fluid leakage into said fluid chamber, a flow rate of said fluid leakage being relatively low such that said fluid leakage drips intermittently onto said sensor section.

20. The mechanical seal according to claim 19, wherein said inlet passage is disposed at an upper end of said fluid chamber to allow drops of said fluid leakage to drop vertically downwardly onto said sensor section.

21. The mechanical seal according to claim 20, wherein said sensor section is spaced vertically above a bottom surface of said fluid chamber.

22. The mechanical seal according to claim 20, wherein said sensor section is disposed at a bottom surface of said fluid chamber to allow drops of said fluid leakage to drop vertically downwardly onto said sensor section, an exit orifice being provided through said side wall to permit said fluid leakage to flow sidewardly out of said fluid chamber.

23. The mechanical seal assembly according to claim 19, wherein said leak detector assembly includes a control unit connected to said fiber optic sensor to determine a leakage flow rate be the frequency of said fluid leakage drips.

* * * * *